United States Patent Office 3,166,850
Patented Jan. 26, 1965

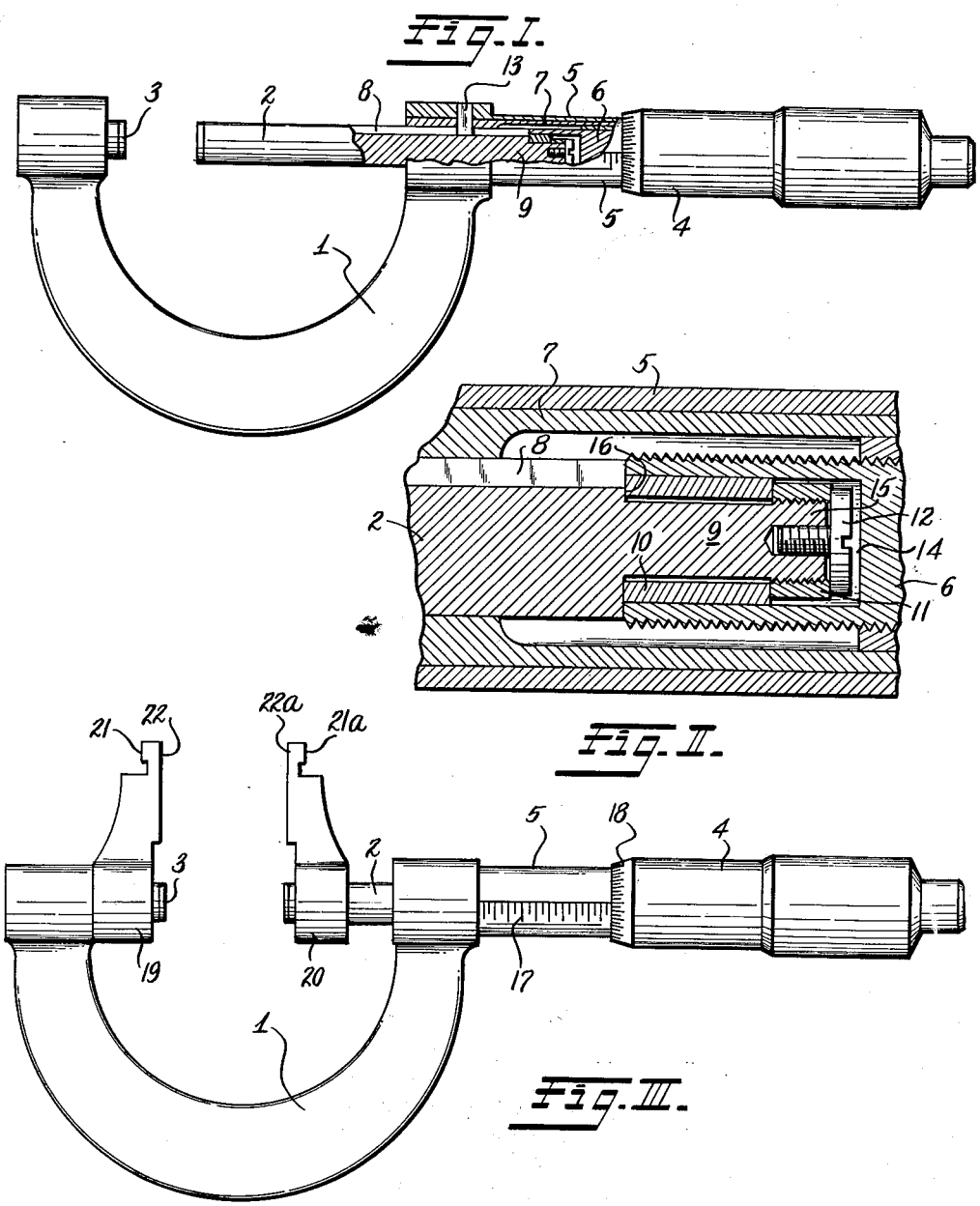

3,166,850
MICROMETERS
Tokumi Yamazawa, Tokyo, Japan, assignor to
Yehan Numata, Yokohama, Japan
Filed May 3, 1963, Ser. No. 277,742
Claims priority, application Japan, Nov. 16, 1962,
37/68,680; Nov. 22, 1962, 37/69,883
1 Claim. (Cl. 33—164)

This invention relates to an improvement in micrometers.

It has heretofore been customary to provide three separate micrometers, each having a different shape, for measuring outside widths, inside widths, and gear widths, and it is the object of the present invention to provide a single micrometer capable of making all three types of measurements.

A preferred embodiment of my invention will now be described, with reference to the accompanying drawings, in which:

FIG. I is a plan view of my new micrometer, with a portion thereof shown in axial section;

FIG. II is a fragmentary axial section on an enlarged scale; and

FIG. III is a plan view of the micrometer with its jaw attachments.

Like reference numerals denote like parts throughout the several views.

As seen in FIGS. I and III, the micrometer comprises a frame 1 carrying an anvil 3. A sleeve 5 is fixed to the frame 1, and a spindle 2 is slidably mounted within the sleeve. A thimble 4 covers the end of the sleeve remote from the frame and an externally threaded rod 6 is mounted coaxially of the thimble and attached at one end thereto so that it turns with the thimble. An internally threaded inner sleeve 7 is mounted within the sleeve 5 and its threads mesh with those on the rod 6. The spindle 2 is provided with an axial groove 8 which receives the key 13 which passes through the sleeves 5 and 7, thus locking the two sleeves together and preventing rotation of the spindle 2 therein, while permitting it to slide axially thereof. The inner end of the spindle comprises a narrowed neck 9, and terminates in a threaded section 15. A smoothly bored collar 10 encircles the spindle neck and is fixed in the recess 14 in the end of the rod 6. An internally threaded adjusting collar 11 holds the smooth-bored collar 10 in place, and is locked in position by means of screw 12 seated on the end of the spindle 2.

Since the collar 10 is locked between the collar 11 and the shoulder 16 preceding the neck of the spindle, and is also fixed to the threaded rod 6, which is in turn fixed to the thimble 4, it will be seen that the thimble and spindle will move axially as a unit. Rotation of the spindle is, however, prevented by the key 13, so that as the thimble rotates, the collar 10 turns on the neck 9 of the spindle 2, imparting axial, but not rotary motion thereto.

The micrometer is read by means of cooperating scales 17, 18, on the outside of the sleeve 5 and thimble 4 respectively.

When it is desired to employ the micrometer as an inside micrometer, detachable jaws 19, 20 may be fixed to the frame over the anvil 3, and to the spindle 2. These jaws have faces 21, 21a, for measuring inside diameters, and 22, 22a for measuring tooth widths.

To make an outside measurement with my new micrometer the object to be measured is inserted between the end of the spindle 2 and the anvil 3. To make an inside measurement, the faces 21, 21a of the jaws are pressed against the inner sides of the opening to be measured, and the thimble rotated in the opposite direction. The measurement is made by setting the base line of the scale 17 to the thimble scale 18.

To measure the tooth width on a gear, the so-called "straddle-tooth" method is used. Several teeth are straddled and the tooth width measuring faces 22, 22a of the jaws are pressed against the tooth faces.

It will of course be appreciated that the embodiment described may be modified as to detail without departing from the spirit of the invention as defined by the following claim.

What is claimed is:

In a micrometer comprising a frame, a fixed jaw carried by said frame and a spindle non-rotatably mounted in said frame for sliding movement toward and away from said fixed jaw, said spindle defining at one end a movable jaw cooperating with said fixed jaw and at its other end a neck, the improvement which comprises a movable member including a thimble and a rod coaxially fixed to the inside of said thimble, said member being threaded onto said frame for helical movement about an axis approximately the same as that of the spindle, said rod being provided with a recess encircling said neck, and a collar fixed to the inner wall of said recess, said collar fitting loosely and rotatably around said spindle neck so that said spindle moves axially with said rod and thimble.

References Cited by the Examiner
UNITED STATES PATENTS

| 363,709 | 5/87 | Whitmore | 33—164 |
| 874,197 | 12/07 | Heym | 33—164 |
| 1,140,611 | 5/15 | Reschke | 33—164 |
| 1,186,364 | 6/16 | Allington | 33—165 |
| 1,290,921 | 1/19 | Davidson | 33—164 |
| 1,431,583 | 10/22 | Johansson | 33—165 |
| 2,516,956 | 8/50 | Carlton | 33—166 |

FOREIGN PATENTS 79,518  12/18  Switzerland.

ISAAC LISANN, *Primary Examiner.*